March 10, 1936.　　　H. R. BOYER ET AL　　　2,033,322
SANDING DEVICE
Filed March 30, 1934
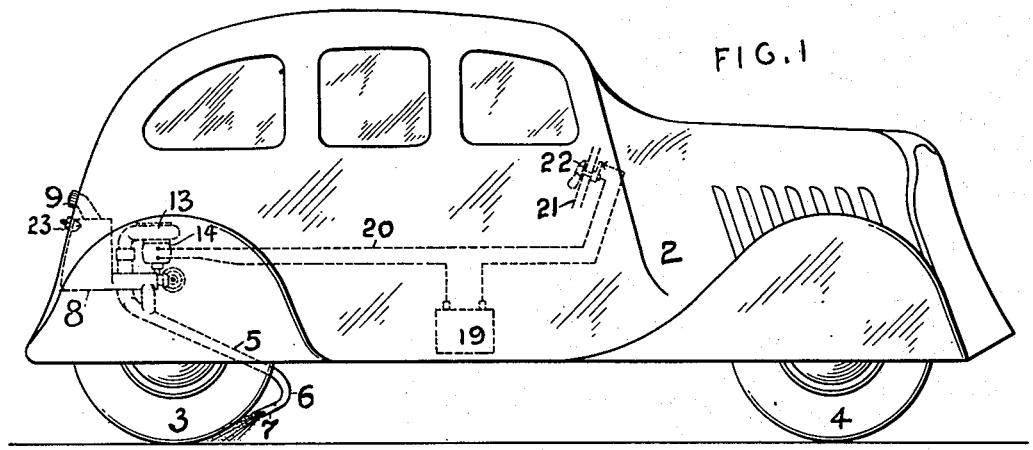
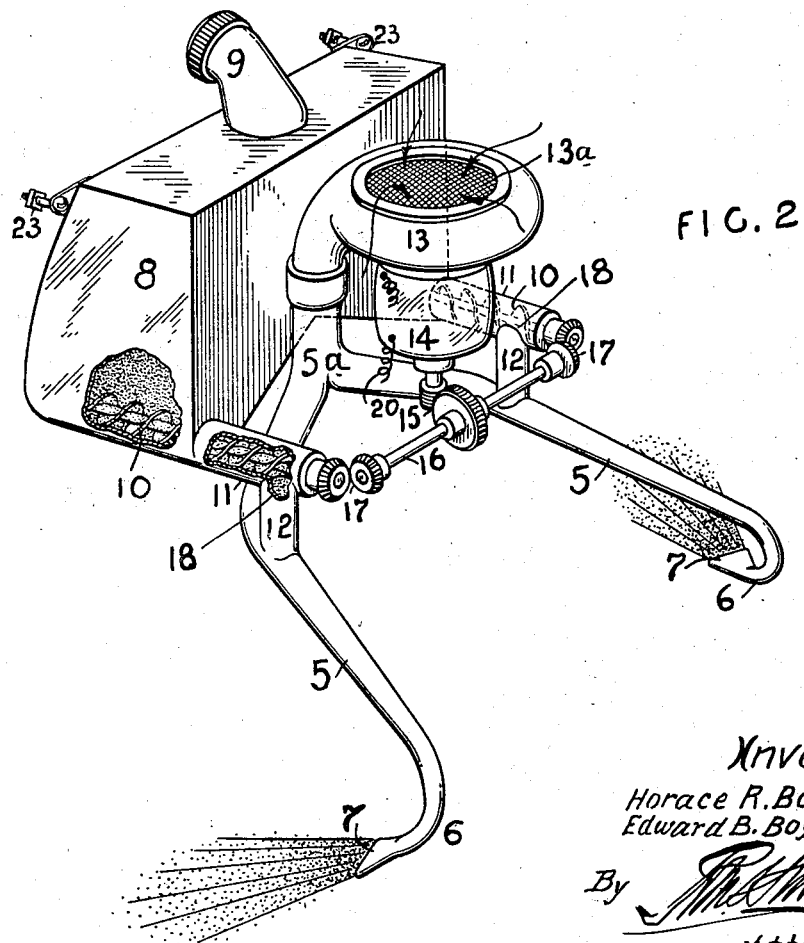
Inventors.
Horace R. Boyer
Edward B. Boyer
By
Attorney.

Patented Mar. 10, 1936

2,033,322

UNITED STATES PATENT OFFICE 2,033,322

SANDING DEVICE

Horace R. Boyer and Edward B. Boyer, Philadelphia, Pa.

Application March 30, 1934, Serial No. 718,185

4 Claims. (Cl. 291—3)

The object of our invention is to provide an automobile with a sanding device adapted to feed sand or gritty material under air blast control into the space immediately in front of and beneath the tread portion of one or more of the wheels of the automobile simultaneously with the rotation thereof, whereby the friction developing material is pressed down upon the ice or snow covered roadway to produce a frictional contact between the revolving wheel or wheels and said supporting roadway.

Our invention further consists of means for definitely feeding sand from a sandbox in measured quantities and delivering it into tubular passages leading from said sandbox to positions immediately in front of and close to the bottom of the wheels or their tires, said means also embodying an air blower for producing a blast upon the sand while in suspended condition and causing it to fall by gravity and increased velocity between the tread of the automobile wheels and the supporting surface of the roadway.

To these ends the sanding device is arranged for mounting as a unit on an automobile and consists of a sandbox having outwardly extending sand passages at opposite ends of the box, screw conveyors located in the passages, arms extending from the passages and forming a support, a fan and motor carried by the support and disposed vertically between the conveyor and a transverse shaft provided on each end with a gear and operated by said motor for driving both conveyors.

With the above and other objects in view, the nature of which will be more fully understood from the following specification, the invention consists in the novel features of construction hereinafter more fully described and defined in the claims.

Referring to the drawing: Fig. 1 is a side elevation of an automobile embodying our improvements; and Fig. 2 is a perspective view, by way of illustration, of means for delivering sand or other suitable gritty material to the tread of the wheels of an automobile.

2 represents the automobile body, 3 the rear or driving wheels, and 4 the front or steering wheels thereof. It will be understood that the automobile itself is equipped with motive power for rotating the driving wheels thereof and under normal control while the car is at rest, and that our invention, therefore, is adapted for use in connection with any automobile or truck irrespective of the general details which enter into its construction.

8 represents a sandbox adapted to be supplied with sand through an inlet 9 thereto, and the bottom of the sandbox is preferably extended laterally of the vehicle to provide a somewhat bifurcated shape to assist the movement of the sand over inclined surfaces and toward the parallel side portions of the sandbox, whereby it may be mechanically fed from the box by horizontally arranged feed screws or conveyors 10 which extend into the tubular passages 11. These feed screws or conveyors 10 are geared together by miter gears 17 and shaft 16, said shaft being driven by a worm and wormwheel gearing 15 and an electric motor 14 which receives current from a battery 19 and circuits 20, the latter provided with a control switch 22 on the dashboard or panel 21. In this manner the sand may be positively fed from the sandbox into vertical passages 12 through which it falls by gravity into tubular passages 5 (preferably tapered) and ultimately delivered from nozzles 7 into the space immediately in front of and close to the lower part of the automobile driving wheel or wheels. The tubular passages 5 are curved at their discharging ends, as at 6, to deliver the sand in a direction opposite to the normal forward propelling movement of the automobile, as clearly shown in the drawing. Furthermore, the nozzle 7 is preferably flattened so as to spread the sand over a width suitable for making a substantial frictional contact between the ice and the tread of the tire.

The motor 14 is provided with a fan 13 whose discharging end is bifurcated at 5a, thereby providing two tubular passages for air leading into the rear upper ends of the tubes 5 so that the air blast is driven through the tubular portions 5a and 5 and escapes from the nozzles 7. While this action is proceeding, sand is fed from the box 8 through the horizontal passages 11 containing the feed screws or conveyors 10 for discharging the sand so fed into vertical passages 12 which open from the under side of the passages 11 and communicate with the upper portion of the passages 5 through which the sand is conveyed to the wheels or tires. The passage of the sand through the vertical tubular passages 12 is by gravity, and said sand while in suspension and reception into the tubular parts 5 is subjected to the blast action of the air from the fan 13 and the communicating bifurcated passages 5a. In this manner, it is seen that there is a controlled feeding of the sand to the nozzles 7 and that moreover the loosened sand in passing through the tubular portions 12 into the passages 5 is subjected to the air blast coming from the fan, and in this way positively fed through the tubular portions 5 and from the nozzles 7. The movement of the sand under the action of the feed screws or conveyor 10 is comparatively slow, whereas the movement of the sand under the action of the air blast is greatly increased in velocity and acts to propel the sand in a more or less spread condition as its passes through the tubular passages 5. In this way, the sand is supplied to and delivered from the nozzles 7 in front of the wheels in a rapid manner and with an avoidance of clogging.

The fan 13 receives the air from the top as indicated by the arrows, but it will be understood that this portion of the fan should be covered with open mesh work as at 13a to prevent any possibility of objects entering the fan and disrupting the mechanism thereof or rendering it unfit for use.

It is to be understood that in the application of our improvements to an automobile, the following features are to be kept in mind: The invention is more particularly applicable to cases where the tires of the automobile permit rotation of the wheel or wheels upon the ice or snow with such freedom that it is difficult or impossible to rely upon the power driven wheels to put the machine into running operation and clear themselves from obstructions which hold it against liberation. It frequently happens, and especially so where the tires are worn, that the wheels will revolve freely upon ice or hardened snow; and it has also been found that it is difficult to supply sand in a manner to provide a frictional contact between the tread of the tire and the ice or snow. However, with our improvements, the gravity action of the sand is so assisted by the air blast that the sand may be caused to travel through the tubular passages and be delivered at the nozzle which is properly positioned in relation to the wheel tire. The application of the sand as a friction creating means is under the control of the operator of the vehicle through the electric switch 22, and the amount of sand permitted to pass to the space in front of the wheel is dependent upon the length of time that the switch 22 is closed and the sand distributing apparatus kept in motion. In this manner, the right accumulation of sand may be provided to insure the proper friction between the wheel tire and the ice or snow, and it is, therefore, possible to provide more or less sand to suit requirements.

It will further be seen that in applying our improvements to automobiles and the like, the wheel or wheels may be given a rotary motion and simultaneously therewith the sanding device may discharge sand from the nozzle 7, and this may be continued until the necessary amount of sand has been positioned to insure the tire taking hold of the same and putting the automobile into motion.

It will further be appreciated that under certain conditions the automobile has a tendency to skid upon ice or snow, and that our improvements, when put into operation at such time and while the automobile is in motion, will be found to be equally effective in preventing such skidding and other objectionable movements of the automobile.

As the use of the improvements of our application are essentially for weather conditions such as induce ice and snow in the streets and therefore would, in point of time, only require a limited use, we have made the sanding device detachable, as at 23, so that during the greater part of the year the device may be removed and stored. We, however, do not restrict ourselves to any special manner of detachably positioning the sanding device upon the automobile; and it is evident that the sanding device may be made in such manner that it is only necessary to remove certain parts of the same, leaving the remainder in permanent position.

Of course the sanding device herein shown and described may be modified and changed in various ways without departing from the invention herein set forth and hereafter claimed.

We claim:

1. A sanding device for mounting as a unit, comprising a sand box having outwardly extending sand passages located close to the bottom of and at opposite ends of the box and connected with downwardly extending discharge pipes, screw conveyors located in the passages and extending into the box, a vertically mounted motor, a transverse shaft driven by said motor and provided with means for driving both screw conveyors, a fan at the upper end of the motor and driven by the motor shaft, and pipes leading from said fan to said discharge pipes.

2. A sanding device for mounting as a unit, comprising a sand box having outwardly extending sand passages located close to the bottom of and at opposite ends of the box and connected with downwardly extending discharge pipes, screw conveyors located in the passages and extending into the box, a vertically mounted motor located between said conveyors, a transverse shaft driven by said motor and provided with means for driving both screw conveyors, a fan at the upper end of the motor and driven by the motor shaft, and pipes leading from said fan to said discharge pipes.

3. A sanding device for mounting as a unit, comprising a sand box having outwardly extending sand passages located close to the bottom of and at opposite ends of the box, screw conveyors located in the passages and extending into the box, hollow arms extending from said passages and forming a support, a fan and motor carried by said support and disposed vertically between said conveyors, said fan discharging its blast into said hollow arms to which said passages are connected and means operated by said motor for driving both conveyors.

4. A sanding device for mounting as a unit, comprising a sand box having outwardly extending sand passages located close to the bottom of and at opposite ends of the box, screw conveyors located in the passages and extending into the box, hollow arms extending from said passages and forming a support, a fan and motor carried by said support and disposed vertically between said conveyors, said fan discharging its blast into said hollow arms to which said passages are connected and a transverse shaft provided on each end with a gear and operated by said motor for driving both conveyors.

HORACE R. BOYER.
EDWARD B. BOYER.